United States Patent
Hohmann et al.

(10) Patent No.: US 10,322,478 B2
(45) Date of Patent: Jun. 18, 2019

(54) TENSIONING DEVICE FOR A SCREW CONNECTION, METHOD FOR TIGHTENING A SCREW CONNECTION, AND THREADED NUT

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 139 days.

(21) Appl. No.: 15/279,498

(22) Filed: Sep. 29, 2016

(65) Prior Publication Data
US 2017/0087675 A1    Mar. 30, 2017

(30) Foreign Application Priority Data
Sep. 29, 2015 (DE) ........................ 10 2015 116 484

(51) Int. Cl.
*B23P 19/06* (2006.01)

(52) U.S. Cl.
CPC .................. *B23P 19/067* (2013.01)

(58) Field of Classification Search
CPC ........................ B25B 29/02; B23P 19/067
USPC ............................ 81/57.38, 185.2
See application file for complete search history.

(56) References Cited

U.S. PATENT DOCUMENTS

| | | | | |
|---|---|---|---|---|
| 284,015 A | * | 8/1883 | Holmes | B25B 13/48 81/75 |
| 2,885,919 A | * | 5/1959 | Carlson | B25B 29/02 285/32 |
| 5,603,594 A | * | 2/1997 | Lincoln | F16B 41/002 411/104 |
| 7,246,542 B2 | * | 7/2007 | Karol | B25B 29/02 81/121.1 |
| 9,981,369 B2 | * | 5/2018 | Hohmann | B25B 29/02 |
| 2011/0192257 A1 | * | 8/2011 | Armstrong | B25B 29/02 81/57.38 |
| 2011/0271798 A1 | | 11/2011 | Wagner et al. | |
| 2014/0245868 A1 | | 9/2014 | Wagner et al. | |

* cited by examiner

*Primary Examiner* — Hadi Shakeri
(74) *Attorney, Agent, or Firm* — Gudrun E. Huckett

(57) ABSTRACT

A tensioning device for elongating a screw assembly, provided with threaded bolt and threaded nut supported on a fixed substructure, by applying a traction force to a free threaded end of the threaded bolt has a cylinder housing with internal wall and a piston movable in the cylinder housing in longitudinal piston direction. The piston together with the internal wall delimits a hydraulic operating space. A replaceable bush entrained by the piston in the longitudinal piston direction has a thread with which the bush can be screwed to the threaded bolt. A support tube is disposed on the cylinder housing, is supported on the fixed substructure, and surrounds the threaded nut. A lock bar is disposed on the support tube and has a lock-bar face facing the piston. The lock-bar face bears on a blocking face of the threaded nut that faces away from the piston.

12 Claims, 2 Drawing Sheets

TENSIONING DEVICE FOR A SCREW CONNECTION, METHOD FOR TIGHTENING A SCREW CONNECTION, AND THREADED NUT

BACKGROUND OF THE INVENTION

The invention relates to a tensioning device for elongating a screw connection which is composed of a threaded bolt and of a threaded nut that is supported on a fixed substructure by way of traction to the free threaded end portion of the threaded bolt.

The invention furthermore relates to a method for tightening a screw connection which is composed of a threaded bolt and of a threaded nut, by means of a tensioning device which elongates the threaded bolt in the longitudinal direction.

Finally, the invention relates to a threaded nut which is suitable for use in such a method.

A bolt-tensioning device of this type and a method of this type are known from US 2011/0271798 A1 and US 2014/0245868 A1. In order for the threaded bolt of the screw assembly to be elongated in the longitudinal bolt direction, a replaceable bush which is provided for screwing to the threaded bolt by way of a thread is disposed in a cylinder housing of the tensioning device. The replaceable bush may be subjected to traction by way of a hydraulic mechanism, so as to elongate the threaded bolt in this way. In order for the replaceable bush to be screwed onto the threaded bolt, the tensioning device is placed from above onto the top of the threaded bolt and is rotated about its own axis, on account of which the replaceable bush is screwed onto the threaded end portion of the threaded bolt. Such screwing-on while rotating the tensioning device about its own axis is time consuming and in view of the weight of screw-tensioning devices of this type also tedious. However, placing the bolt-tensioning device from above onto the top of the screw assembly is indeed the ideal case. The fitter, however, is often confronted with a situation in which screw bolts have to be re-tightened from below, that is to say in an overhead situation. Handling a bolt-tensioning device as described in US 2011/0271798 A1 and US 2014/0245868 A1 is associated with significant issues, since upward screwing-in has to be performed taking into account the substantial weight of the bolt-tensioning device.

It is the object of the invention to provide a device which is particularly suitable for re-tightening a screw connection and which is also suitable for employment in other orientations and even in the case of overhead screw-assembly jobs. Furthermore, a respective method for tightening the screw connection, and a threaded nut which is suitable therefor are to be provided.

SUMMARY OF THE INVENTION

In order for this object to be achieved it is proposed in terms of the tensioning device that the support tube is provided with a lock bar which for bearing on a blocking face of the threaded nut that faces away from the piston is provided with a lock-bar face that faces the piston. In order for a simple type of construction of the lock bar to be achieved, the latter is preferably guided on the support tube movably such that said lock bar carries out a movement which is transverse to the longitudinal piston direction.

By way of the lock bar there is the possibility for the support tube during the preparation of the actual tensioning process to be locked in the longitudinal direction in relation to the screw connection. Herein, the lock bar engages in the threaded nut of the screw connection to be elongated. To this end, the lock bar is provided with a lock-bar face which is directed towards the piston. The threaded nut is of a special type of construction in that the former is provided with a blocking face which faces away from the piston of the tensioning device and in which the lock bar can engage. As a result, the threaded nut in the locking position is engaged from behind by the lock-bar face of the lock bar. Therefore, the threaded nut during the preparation of the tensioning process carries the weight of the tensioning device.

In that the lock bar is disposed on the support tube of the tensioning device, the support tube, and thus indirectly also the tensioning device, may be coupled to the threaded nut. This is performed by way of a form-fit between the lock bar and the threaded nut. All further jobs in the context of the preparation of the tensioning process may henceforth be carried out without the operator having to hold or lift, respectively, the substantial dead weight of the tensioning device, or even having to rotate the entire device in the manner of a screwing movement. Handling of the screw-tensioning device is substantially facilitated and also made safer for the operator above all in the case of overhead jobs, or else in the case of jobs having a horizontal screw-assembly axis, for example.

By way of one design embodiment it is proposed that guide faces for guiding the lock bar are configured on the lock bar, on the one hand, and on the support tube, on the other hand, wherein, these guide faces extend tangentially in relation to the longitudinal piston axis. For example, a first tangentially extending guide-face pair may be disposed on the one side of the longitudinal piston axis, and a second tangentially extending guide-face pair may be disposed on the other side of the longitudinal piston axis. In this manner, a relatively uniform distribution of the weight forces in relation to the circumference of the threaded nut is achieved.

The lock bar is preferably configured as a slide from two mutually parallel longitudinal portions, the guide faces and lock-bar faces being configured on each of said longitudinal portions. In this case, the lock-bar faces are on the mutually opposite internal peripheries of the two longitudinal portions of the lock bar.

According to a further design embodiment, a releasing portion, preferably configured as a segment of a circle, and a lock-bar portion are configured so as to be successive with respect to one another on each longitudinal portion, wherein the lock-bar face is located on the lock-bar portion.

According to a further design embodiment, the two longitudinal portions at least at one end thereof are fixedly interconnected by a transverse web. The transverse web facilitates handling of the lock bar; moreover, the location of said transverse web may serve as an indicator as to whether the lock bar is located in the locking position thereof or in the release position thereof.

A further design embodiment is characterized by a spring element which, on the one hand, is supported on the support tube and, on the other hand, is supported on the lock bar, and which impinges the lock bar in the locking direction. The spring element is a contribution in terms of safety, since locking, once established, cannot be automatically unblocked again. Rather, in order to be released or unblocked, respectively, the lock bar has to be unblocked counter to the spring force and thus in a conscious manner.

Preferably, the support tube in relation to the cylinder housing is a discrete component part and is separable from the latter, and the support tube and the cylinder housing are connectable in the longitudinal piston direction by at least one connection element. In the case of this type of construction, only the support tube may therefore be locked to the threaded nut initially. It is only in a further step that fastening of the significantly heavier cylinder housing to the support tube which to this extent is already securely fixed is performed, before the replaceable bush is subsequently inserted into the cylinder housing and is screwed onto the free threaded end of the threaded bolt. For this screwing action, the operator needs to lift only the relatively minor weight of the replaceable bush, or to simultaneously set the latter in rotary motion about the longitudinal piston axis, respectively.

In order to achieve the object in regard to the method, a method for tightening a screw connection which is composed of a threaded bolt and of a threaded nut, by means of a tensioning device is proposed, comprising:
  a. bringing the support tube to bear on that substructure against which the threaded nut is tightened, in such a manner that the support tube surrounds the threaded nut;
  b. longitudinally locking the support tube on a blocking face of the threaded nut that faces the substructure;
  c. inserting the replaceable bush into the cylinder housing until the replaceable bush contacts the free end of the threaded bolt;
  d. screwing the replaceable bush to the threaded bolt;
  e. building up the hydraulic pressure on the piston;
  f. and re-tightening the threaded nut by way of the engagement of a tool in an engagement structure of the threaded nut that is disposed outside the blocking face.

Such a method as a precondition requires as a component part of the screw connection to be tightened a threaded nut which is designed so as to be sufficiently supportive. Accordingly, in terms of the threaded nut, it is proposed that the latter has:
  a contact area surrounding the thread;
  engagement structures for a tool that is capable of being applied from the outside to the threaded nut; and
  a blocking face which is engageable from below by the lock bar and which is disposed so as to be spatially apart from the engagement structures and so as to face in the direction towards the contact area.

For high payloads, the blocking face of the threaded nut preferably extends parallel with the contact area of the threaded nut.

Moreover, it is advantageous for the blocking face to have the design of an annular face having a circular internal periphery and a circular external periphery. Moreover, it is advantageous for the blocking face to be configured on a radial flange of the threaded nut which extends across the circumference of the threaded nut. Moreover, it is advantageous for the blocking face to be the groove wall of an annular groove which extends across the circumference of the threaded nut. Moreover, it is advantageous for the other groove wall of the annular groove to have the shape of a truncated cone. Moreover, it is advantageous for the engagement structures for the lock bar that is coupleable to the threaded nut to be located on a longitudinal portion of the threaded nut which is disposed between the radial flange and the contact area.

Moreover, it is advantageous for the engagement structures to be located on a cylindrical longitudinal portion of the threaded nut, wherein the engagement structures are blind holes in this cylindrical longitudinal portion. This design embodiment enables a threaded nut of relatively compact design, while having sufficient loading capability. Said threaded nut can be particularly designed in a more compact manner than in the case of a threaded nut which on the circumference thereof is provided with key faces for a hexagonal wrench.

BRIEF DESCRIPTION OF THE DRAWINGS

Further details and advantages are derived from the following description of an exemplary embodiment which is illustrated in the drawings.

DESCRIPTION OF PREFERRED EMBODIMENTS

Figure 1:
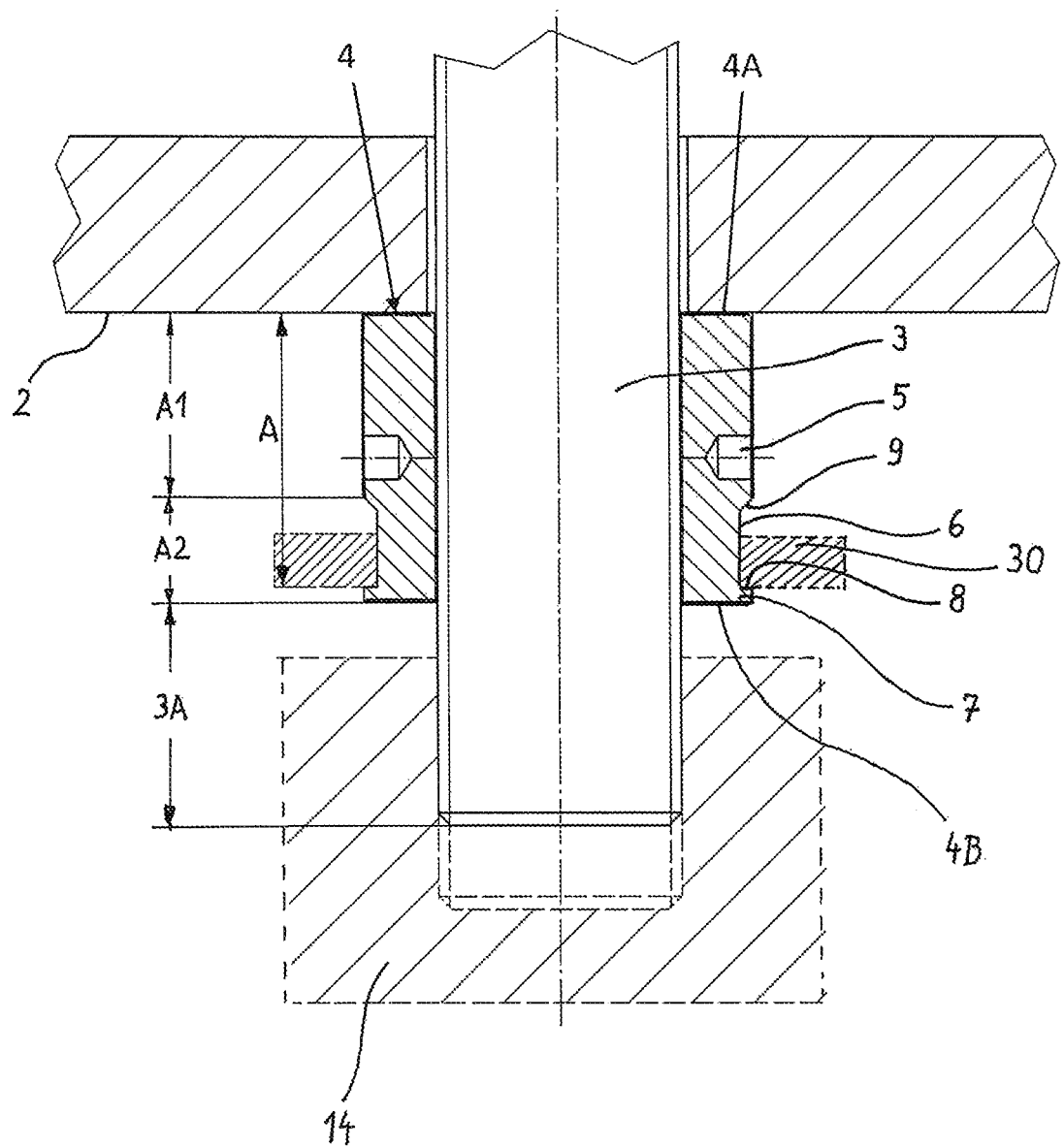
FIG. 1 shows a longitudinal section through a screw connection from a threaded bolt and from a threaded nut, wherein a replaceable bush and a lock bar of a threaded-bolt tensioning device have been schematically added.

FIG. 1 in a longitudinal section shows a screw connection which is conceived for high tensile loads. Said screw connection is assembled from a threaded bolt 3 which is routed through the component to be screwed and, over a partial length, is routed out of the component, and from a threaded nut 4 on the routed-out threaded portion of the threaded bolt. By way of the tensile forces acting in the threaded bolt 3, the threaded nut 4 by way of the contact area 4A thereof, which annularly surrounds the internal thread of said threaded nut 4, is supported on the component. The external side of the component in the region supporting the threaded nut 4 is hereunder referred to as the substructure 2.

The length of the threaded bolt 3 is chosen such that a threaded end portion 3A just projects freely beyond the external side 4B of the threaded nut 4. The length of this free threaded end portion 3A should be at least equal to the bolt diameter of the threaded bolt. In this manner, a sufficient threaded supporting length is available for connecting to a replaceable bush 14. The replaceable bush 14 is a component part of a tensioning device which will be described in more detail hereunder and by way of which the threaded bolt 3 may be elongated or stretched in the longitudinal direction, respectively, so that the threaded nut 4 may subsequently be re-tightened without a high effort in terms of force.

The threaded nut 4 on the external circumference thereof has two longitudinal portions A1, A2 with dissimilar functions.

On that longitudinal portion A1 that is closer to the contact area 4A and that is of cylindrical design, the threaded nut 4 is provided with structures 5 for the engagement of a tool which is capable of being applied radially from the outside. The engagement structures 5 here are blind holes which are disposed so as to be distributed uniformly, that is to say at identical angular spacings, across the circumference of the threaded nut, and into each of which a pin-shaped tool for rotating the threaded nut may be radially introduced.

On that longitudinal portion A2 that is more remote from the contact area 4A, the threaded nut 4 is provided with an encircling annular groove 6. That groove wall 9 of the annular groove 6 that is closer to the contact area 4A preferably has the shape of a cone or of a truncated cone, respectively.

That groove wall of the annular groove 6 that is more remote from the contact area 4A is preferably disposed so as to be parallel with the contact area 4A. Said groove wall has the design of an annular face and in the context of the tensioning process that will be described in more detail hereunder serves as a blocking face 8 on which a lock bar 30 of the tensioning device which is used in the case of the tensioning process may be supported. Due to the dissimilar function, the blocking face 8 is disposed outside that longitudinal portion A1 on which the threaded nut 4 is provided with the engagement structures 5.

The annular blocking face 8, for sufficient strength, is located on a radial flange 7. The radial flange 7 extends in a circular manner across the entire circumference of the threaded nut 4. Preferably, the diameter of the radial flange 7 is not larger than the remaining maximum diameter of the threaded nut since the annular groove 6 and the radial flange 7 each are circular, the blocking face 8 has the design of a flat or optionally of a slightly conical annular face having a circular internal periphery and a circular external periphery. This advantageously offers the maximum in terms of area for rearward engagement; moreover, the size of the blocking face 8, on account thereof, is independent of the respective rotary position of the nut.

Figure 2:
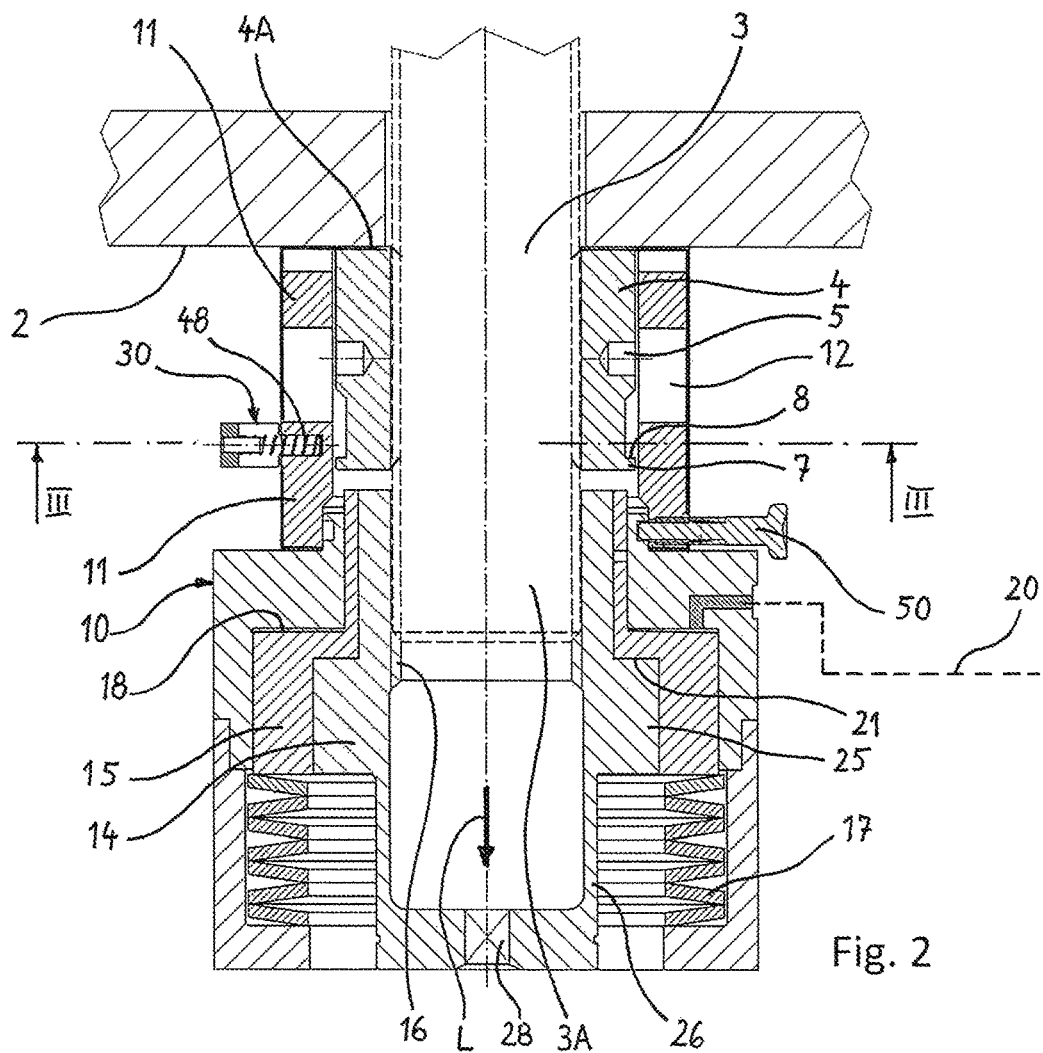
FIG. 2 shows a longitudinal section through the threaded-bolt tensioning device, attached so as to align to the threaded bolt and temporarily secured by engaging behind the threaded nut of the screw assembly.
Figure 3:
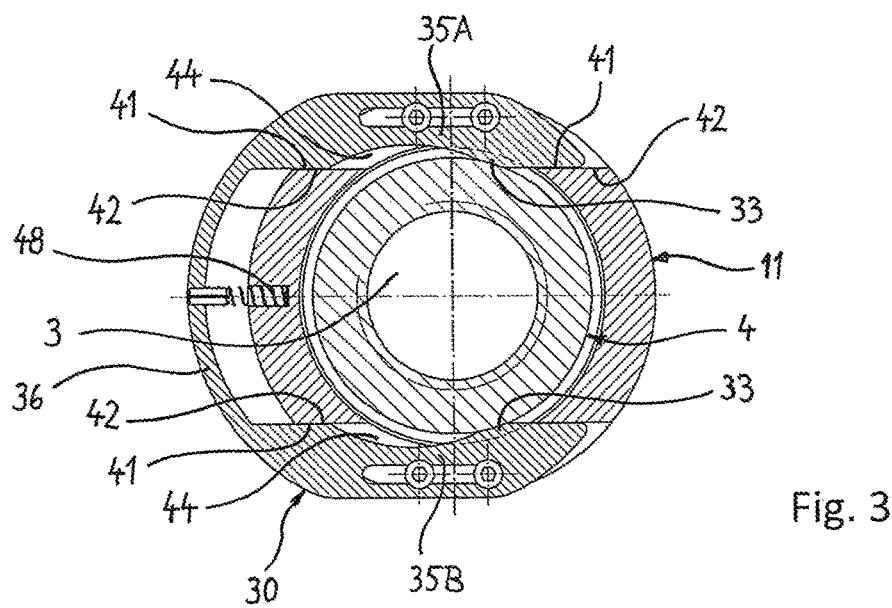
FIG. 3 shows a cross section corresponding to the section plane as indicated in FIG. 2.

The tensioning device which is reproduced in FIGS. 2 and 3, and which is to be operated in a hydraulic manner, serves for tightening, in particular for re-tightening, and optionally also for releasing the screw connection reproduced in FIG. 1. By way of the tensioning device, a predefined pre-tensioning force may be applied to the threaded bolt 3 in the longitudinal bolt direction for a certain time, on account of which said threaded bolt 3 is somewhat stretched, so that the threaded nut 4 of the screw connection, which is screwed onto the threaded bolt 4, may meanwhile be tightened or re-tightened, respectively.

A replaceable bush 14 which is disposed centrally in the tensioning device, on one end thereof is provided with a thread 16 in the design embodiment of an internal thread. By way of this thread 16 the replaceable bush 14, prior to the commencement of the tensioning process, is screwed onto that threaded end portion 3A of the threaded bolt 3 that projects beyond the threaded nut 4. Subsequently, the replaceable bush 14 which in this way is screwed to the threaded bolt 3 is hydraulically subjected to a traction force, on account of which the screw assembly is elongated in the longitudinal direction L. On account thereof, the contact area 4A of the threaded nut 4 is moved clear such that the threaded nut 4 may be rotated almost without resistance and in this manner may be tightened again against the fixed substructure 2 thereof.

The hydraulic tensioning mechanism is enclosed by a pressure-tight cylinder housing 10. The latter may be assembled from a plurality of cylindrical portions in a modular fashion. A support tube 11 is added onto the cylinder housing as a rigid continuation of the cylinder housing 10. Here, the support tube 11 is a component part that is separate from the cylinder housing 10, in particular a component part that is separable from the cylinder housing 10.

The support tube 11 is open towards the threaded bolt 3, surrounds the threaded nut 4, and is supported on the substructure 2. Therefore, the substructure 2 in the case of the tensioning process forms the counterbearing. In the application reproduced in FIG. 1, the substructure 2 on which the threaded nut 4 and the support tube 11 are supported is the downwardly oriented face of a machine part or of a plant part. The tensioning process here thus is performed by downwardly oriented traction force to the threaded bolt 3, wherein the threaded nut 4 for re-tightening is screwed upwards until the latter by way of the contact area 4A thereof bears tightly on the substructure 2 again.

The support tube 11 is provided with at least one opening 12. The opening 12 is of such a size that the threaded nut 4 may be rotated and thus re-tightened through this opening. Of course, this rotation is only possible when the tensioning device is operated and the threaded nut 4 therefore is not stressed by substantial friction. Rotating the threaded nut 4 may also be performed by way of a small gearbox which is attached laterally on the support tube 11 and operates through the opening 12.

A hydraulic connector by way of which the hydraulic operating space 18 of the tensioning device is connected in a valve-controlled manner to an external hydraulics supply is located laterally on the cylinder housing 10.

The cylinder housing 10 comprises one hydraulic cylinder, or else alternatively a plurality of hydraulic cylinders, which by way of the hydraulic connector and a flexible pressure-tight hydraulics line 20 is/are connected to the external hydraulics supply, so as to impinge a piston 15 with hydraulic pressure. A piston 15 is disposed so as to be movable in the longitudinal direction in each hydraulic cylinder, and so as to be sealed towards the cylinder interior wall. Only one cylinder stage and therefore also only one piston 15 are present in the exemplary embodiment described here.

The piston 15 is pushed downwards by the build-up of a hydraulic force in the hydraulic operating space 18 of the cylinder. This is performed counter to the force of a strong spring 17 which impinges the piston 15 from below. The spring 17 serves as a piston-restoring spring, and impinges the piston 15 directly with a force which aims to hold the piston 15 in the default position thereof as reproduced in FIG. 2, in which the hydraulic operating space 18 is at its minimum.

The piston 15 surrounds the replaceable bush 14 in an annular manner. Said piston 15 on the internal periphery thereof is provided with an encircling step which faces away from the substructure 2 and which forms an entrainment face 21 on which the replaceable bush 14 is supported by way of a radially expanded portion 25. In this manner, the replaceable bush 14 is axially entrainable by the piston 15.

The replaceable bush 14 is assembled from a portion which encloses the internal thread 16, from the radially expanded portion 25, and from an end piece 26. The replaceable bush 14 is located centrally on the longitudinal axis of the tensioning device, and at the bolt-side end thereof, is provided with the internal thread 16 for screwing onto the threaded bolt 3.

The end piece 26 is located at the other end of the replaceable bush, that is to say that end of the replaceable bush that faces away from the thread 16. The end piece 26 is so slender that it is capable of being readily gripped by hand, so as to in this way screw the replaceable bush 14 onto the threaded end portion 3A of the threaded bolt, in preparation for the actual tensioning process. In order for this screwing to be completed in a mechanized manner, a key face 28 to which a commercially available tool may be applied so as to rotate the replaceable bush 14 in relation to the cylinder housing 10, on the one hand, and in order to move the replaceable bush 14 in the longitudinal direction towards the threaded bolt 3, on the other hand, and to screw said replaceable bush 14 to the latter, is configured in the end piece 26. The replaceable bush 14 is configured so as to be freely rotatable in relation to the piston 15. The diameter of said replaceable bush 14 is so minor that the latter may be inserted into the cylinder housing 10 without having to first remove the spring 17.

The threaded nut 4 is provided with the blocking face 8 which is engageable from behind by a lock bar 30 and which points in the direction towards the contact area 4A. For bearing on the blocking face 8, the lock bar 30 is provided with a lock-bar face 33 which faces the piston 15. In that the lock-bar face 33 of the lock bar 30 engages the blocking face 8 configured on the threaded nut 4 from behind, the lock bar 30 which in turn is disposed on the support tube 11, in the situation according to FIG. 2 is locked in the longitudinal direction L on the threaded nut 4. The support tube 11 therefore is "suspended" on the threaded nut 4.

According to FIG. 2, the lock bar 30 which is designed in the shape of a horseshoe is guided on the support tube 11 so as to be movable transversely to the longitudinal direction of the latter. For guiding the lock bar 30, guide faces 41 are configured on the support tube 11, and guide faces 42 are configured on the lock bar 30, wherein these guide-face pairs 41, 42 extend tangentially in relation to the longitudinal piston axis L of the tensioning device. In that the lock bar 30 is of an overall horseshoe-shaped design, a first guide-face pair 41, 42, which extends tangentially to the longitudinal piston axis L, is located on the one side of the longitudinal piston axis L, and a second guide-face pair 41, 42 is located on the other side of the longitudinal piston axis L.

The lock bar 30 has an overall design of a horseshoe-shaped slide from two mutually parallel-disposed longitudinal portions 35A, 35B on which the guide faces 42 and the lock-bar faces 33 are also configured, and from a transverse web 36 which rigidly interconnects the longitudinal portions 35A, 35B. Blocking and releasing of the lock bar 30 is performed in that the latter is moved transversely to the support tube 11, wherein the guide faces 42 configured on the lock bar 30 are guided in a rectilinear manner by the guide faces 41 which are configured on the support tube 11.

In order for the blocking position to be implemented, on the one hand, and for the release position to be implemented, on the other hand, a releasing portion 44, configured as a segment of a circle, and a lock-bar portion on which the actual lock-bar face 33 is located, are configured so as to be successive with respect to one another on each longitudinal portion 35A, 35B of the lock bar 30.

In FIG. 3 it is reproduced how the lock-bar portion and thus the lock-bar face 33 in the blocking position of the lock bar come to bear on the blocking face 8 which is configured on the radial flange 7 of the nut such that the support tube 11 in the longitudinal piston direction. L is locked in a form-fitting manner to the threaded nut 4. In order for this longitudinal locking to be almost free of play, the spacing A, measured in the longitudinal direction L, on the threaded nut 4 between the blocking face 8 and the contact area 4A should be approximately equal to the spacing of the lock-bar face 33 from that end face of the support tube 11 that bears on the substructure 2.

By contrast, if the lock bar is moved from the locking position, reproduced in FIG. 3, to the right into the unblocking position thereof, the radial flange 7 of the nut comes to lie between the two releasing portions 44 designed as a segment of a circle, on account of which the rearward engagement of the threaded nut 4 is cancelled. This unblocking of the lock bar is possible only counter to the counter-acting force of a spring element 48 which impinges the lock bar 30 in the direction of locking, and is supported on the support tube 11, on the one hand, and on the lock bar 30, on the other hand. According to FIG. 3, the spring element 48 is disposed in the region of the transverse web 36.

The cylinder housing 10 of the tensioning device is connectable to the support tube 11 by way of a plurality of connection elements 50. In the case of the exemplary embodiment described here, three bolts 50 which are disposed across the circumference of the tensioning device serve as connection elements.

According to FIG. 2, each bolt 50 is guided in a bore in the support tube 11, and is latchable in a spring-loaded manner in a blind hole in the cylinder housing 10. Conversely, it is also possible for the bolts 50 to be guided in the cylinder housing 10 and to allow for the former to be latched in respective blind holes in the support tube 11, so as to attain a rigid connection between the cylinder housing 10 and the support tube 11.

The procedure for a tensioning process in which the threaded nut 4 of the screw assembly is supported from below on a substructure 2, for example a machine part or a machine frame, is as follows:

First, only the support tube 11, that is to say separated from the cylinder housing 10, is placed from below over the threaded nut 4. Herein, the lock bar 30 is retracted counter to the force of the spring element 48, that is to say that the releasing portions 44, in the shape of segments of a circle, of the lock bar 30 release the circumference of the threaded nut.

As soon as the support tube 11 comes to bear on the substructure 2, the lock bar 30 is released or let loose, respectively. The lock bar 30 under the force of the spring element 48 automatically slides to the locking position of said lock bar 30, in that the lock-bar portions having the lock-bar faces 33 configured thereon come to lie behind the blocking face 8 configured on the nut. On account thereof, the support tube 11 is longitudinally locked to the threaded nut 4, that is to say is fixed in the longitudinal direction L. The longitudinal locking, above all by way of the material thickness of the radial flange 7 of the nut, is conceived for reliably withstanding the tensile loads by virtue of the dead weight of the tensioning cylinder.

Thereafter, in a further step, the cylinder housing 10 is fastened to the support tube 11; this may be performed by way of the already described bolt connections with the bolts 50.

Up to this point in time, the replaceable bush 14 is not yet inserted in the cylinder housing 10. Rather, the replaceable bush 14 is screwed on only in a further step. To this end, the replaceable bush 14 is initially inserted from below into the cylinder housing 10 so far until contact between the replaceable bush 14 and the free end of the threaded bolt 3 is established. Thereafter, the replaceable bush 14, by hand or by means of a tool that is applied to the key face 28, is screwed onto the threaded end portion 3A of the threaded bolt 3. In the case of this screwing, the operator has only to carry the minor dead weight of the replaceable bush 14. Since the cylinder housing 10 per se is fixed to the threaded nut 4 by means of the support tube 11, and therefore does not have to be raised or rotated any more.

If and when the replaceable bush 14 has been completely screwed onto the threaded end portion 3A of the threaded bolt 3, the hydraulic tensioning process may subsequently commence. If and when the hydraulic pressure on the piston has been built up, the blocking faces 8 and the lock-bar faces 33 are not stressed, since the tensioning force of the threaded bolt 3 being elongated or stretched, respectively, is discharged exclusively by way of the support tube 11, of correspondingly large dimension, from the cylinder housing 10 to the substructure 2 which serves as a counterbearing.

Finally, the lock bar 30 is unblocked by hand and counter to the force of the spring 48, thereby removing the tensioning device from the screw assembly.

The specification incorporates by reference the entire disclosure of German priority document 10 2015 116 484.1 having a filing date of Sep. 29, 2015.

While specific embodiments of the invention have been shown and described in detail to illustrate the inventive principles, it will be understood that the invention may be embodied otherwise without departing from such principles.

LIST OF REFERENCE CHARACTERS

2 Substructure
3 Threaded bolt
3A Threaded end portion
4 Threaded nut
4A Contact area of the nut
4B External side of the nut
5 Engagement structure
6 Annular groove
7 Radial flange
8 Blocking face
9 Groove wall
10 Cylinder housing
11 Support tube
12 Opening
14 Replaceable bush
15 Piston
16 Thread
17 Spring
18 Hydraulic operating space
20 Hydraulics line
21 Entrainment face
25 Radially extended portion
26 End piece
28 Key face
30 Lock bar
33 Lock-bar face
35A Longitudinal portion
35B Longitudinal portion
36 Transverse web
41 Guide face
42 Guide face
44 Releasing portion
48 Spring element
50 Connection element, bolt
A Spacing
A1 Longitudinal portion
A2 Longitudinal portion
L Longitudinal direction

What is claimed is:

1. A tensioning device for elongating a screw assembly, comprised of a threaded bolt and of a threaded nut supported on a fixed substructure, by applying a traction force to a free threaded end portion of the threaded bolt, the tensioning device comprising:
   a cylinder housing comprising an internal wall;
   at least one piston movable in the cylinder housing in a longitudinal piston direction, the at least one piston together with the internal wall of the cylinder housing delimiting a hydraulic operating space;
   a replaceable bush operatively connected to the at least one piston to be entrained by and to move together and along with the at least one piston in the longitudinal piston direction, wherein the bush comprises a thread for screwing the bush onto the threaded bolt;
   a support tube coaxially directly supported on the cylinder housing and surrounding the threaded nut, the support tube configured to be supported on the fixed substructure;
   a lock bar disposed on the support tube, wherein the lock bar comprises at least one lock-bar face facing the at least one piston, wherein the lock bar is configured to bear with the lock-bar face on a blocking face of the threaded nut, the blocking face of the threaded nut facing away from the at least one piston.

2. The tensioning device according to claim 1, wherein the lock bar is guided on the support tube so as to be movable transversely to the longitudinal piston direction.

3. The tensioning device according to claim 2, wherein the lock bar comprises first guide faces and the support tube comprises second guide faces, wherein the first and second guide faces interact with each other to guide the lock bar on the support tube, wherein the first and second guide faces extend tangentially relative to the longitudinal piston axis.

4. The tensioning device according to claim 3, wherein the lock bar is a slide comprising two parallel longitudinal portions, wherein the first guide faces and the at least one lock bar face are disposed on the longitudinal portions.

5. The tensioning device according to claim 4, wherein the longitudinal portions each comprise a releasing portion and a lock-bar portion arranged successively along the longitudinal portion, respectively, wherein the releasing portion is configured as a segment of a circle and wherein the lock-bar portion is provided with the at least one lock-bar face.

6. The tensioning device according to claim 4, wherein the slide comprises a transverse web connecting the longitudinal portions at one end thereof.

7. The tensioning device according to claim 1, further comprising a spring element having a first end supported on the support tube and a second end supported on the lock bar, wherein the spring element loads the lock bar in a locking direction.

8. The tensioning device according to claim 1, wherein the support tube is a discrete component separate from the cylinder housing and is separable from the cylinder housing, and wherein the support tube and the cylinder housing are connectable in the longitudinal piston direction by one or more connection elements.

9. The tensioning device according to claim 8, wherein the connection elements are bolts distributed circumferentially about the tensioning device.

10. A method for tightening a screw connection, comprised of a threaded bolt and of a threaded nut, by a tensioning device according to claim 1, which elongates the threaded bolt in a longitudinal direction of the threaded bolt, the method comprising:
   a. positioning the support tube on a substructure against which the threaded nut is tightened so as to surround the threaded nut;
   b. longitudinally locking the support tube on the blocking face of the threaded nut, wherein the blocking face is facing the substructure;
   c. inserting the replaceable bush into the cylinder housing until the replaceable bush contacts a free end of the threaded bolt;
   d. screwing the replaceable bush to the threaded bolt;
   e. building up a hydraulic pressure acting on the piston;
   f. re-tightening the threaded nut by a tool engaging an engagement structure of the threaded nut disposed remote from the blocking face.

11. The method according to claim 10, wherein longitudinally locking the support tube comprises transferring the lock bar, guided on the support tube, from a release position to a locking position, wherein in the locking position the at least one lock-bar face of the lock bar bears on the blocking face of the threaded nut.

12. The method according to claim 10, further comprising unblocking the lock bar counter to a force of a spring element.

\* \* \* \* \*